United States Patent [19]

Meistrell

[11] Patent Number: 4,707,031
[45] Date of Patent: Nov. 17, 1987

[54] HEAD RESTRAINT

[76] Inventor: Robert F. Meistrell, 413 Via Pasqual, Redondo Beach, Calif. 90277

[21] Appl. No.: 882,746

[22] Filed: Jul. 7, 1986

Related U.S. Application Data

[63] Continuation of Ser. No. 605,173, Apr. 30, 1984, abandoned.

[51] Int. Cl.⁴ .......................... A47C 7/38; B60R 22/00
[52] U.S. Cl. ..................................... 297/393; 128/134; 297/391; 297/464
[58] Field of Search ............... 297/391, 393, 397, 464, 297/468, 481; 128/133, 134; 24/306; 2/DIG. 6, DIG. 11

[56] References Cited

U.S. PATENT DOCUMENTS

| | | | |
|---|---|---|---|
| 2,638,293 | 5/1953 | Lindstrom | 293/393 |
| 2,726,714 | 12/1955 | McAndrews | 128/134 |
| 2,863,450 | 12/1958 | Johnson | 128/134 |
| 2,949,152 | 8/1960 | Hipps et al. | 297/488 |
| 3,136,311 | 6/1964 | Lewis . | |
| 3,485,529 | 12/1969 | Marting | 297/481 |
| 3,713,695 | 1/1973 | Von Wimmerspag | 297/488 |
| 3,897,777 | 8/1975 | Morrison . | |
| 3,982,132 | 9/1976 | Kay et al. | 128/133 |
| 4,058,853 | 11/1977 | Boxer et al. | 2/DIG. 6 |
| 4,182,322 | 1/1980 | Miller | 128/133 |
| 4,205,670 | 6/1980 | Owens | 128/134 |
| 4,339,151 | 7/1982 | Riggs | 297/393 |

FOREIGN PATENT DOCUMENTS 525358  9/1921  France ................................ 128/134

Primary Examiner—Kenneth J. Dorner
Assistant Examiner—Mark W. Binder
Attorney, Agent, or Firm—William W. Haefliger

[57] ABSTRACT

A head support for a traveler sitting in a chair having a headrest, and which includes:
(a) a first band adapted to be fitted in adjustably wrapped condition closely about the user's head and at eye or forehead level,
(b) band retention structure associated with the band for retaining the band in said wrapped condition, and
(c) head restraint structure coupled to the band and adapted to be coupled to the headrest for restraining the user's head against lateral side-to-side movement relative to the headrest.

1 Claim, 6 Drawing Figures

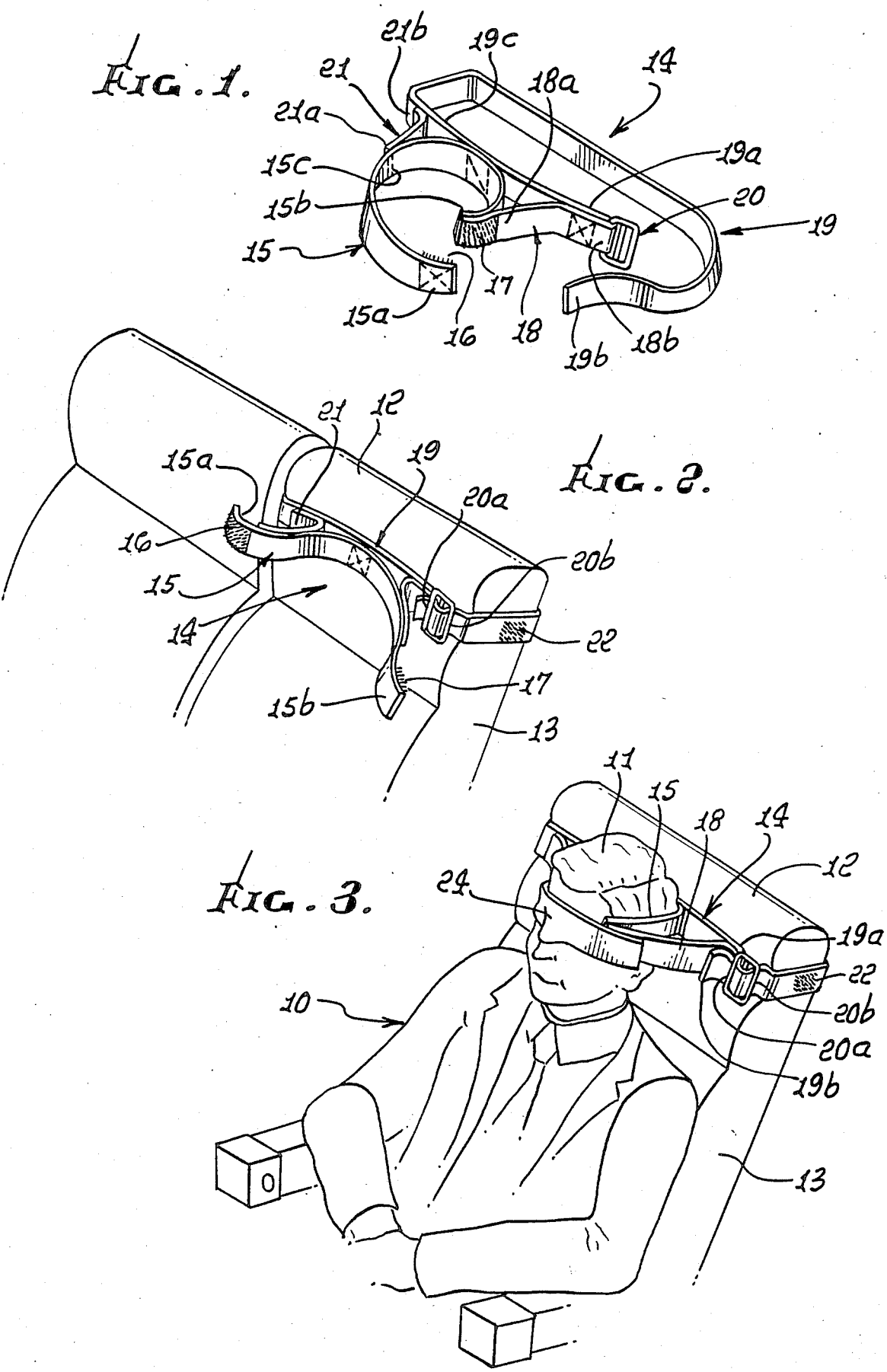

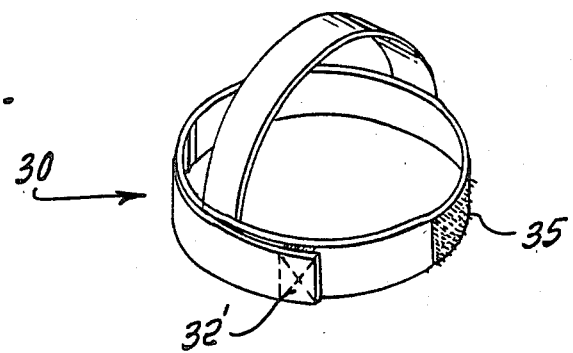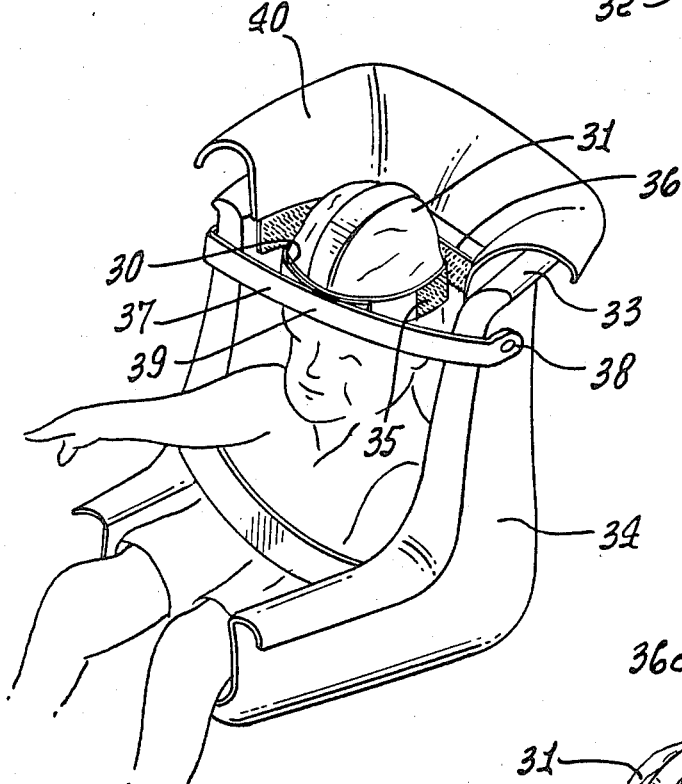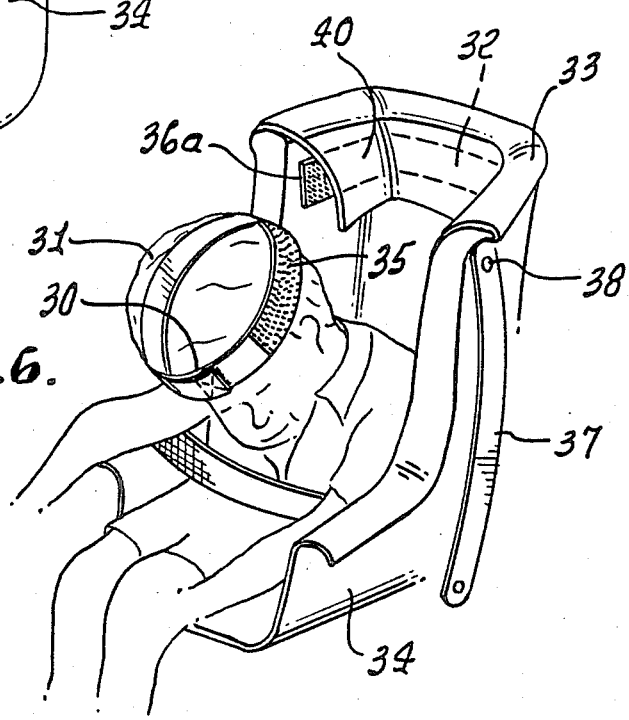

HEAD RESTRAINT

This is a continuation, of application Ser. No. 605,173 filed Apr. 30, 1984, now abandoned.

BACKGROUND OF THE INVENTION

This invention relates generally to head restraints or supports, and more particularly to multifunctional restraints.

When travelers on commercial aircraft and other means of transportation attempt to doze or sleep in their chairs or seats, muscle relaxation leads to head twisting to the left or right which interrupts such attempts. Accordingly, there is a need for a means to overcome this problem so that travelers can gain needed rest.

SUMMARY OF THE INVENTION

It is a major object of the invention to provide a solution to the above problem, as well as associated problems, through provision of an improved head restraint having multiple functions, as will appear. Basically, the head support of the invention is adapted for use by a traveler sitting in a chair or seat having a headrest, and comprises:

(a) a first band adapted to be fitted in adjustably wrapped condition closely about the user's head and at eye or forehead level, (b) retaining means associated with the band for retaining the band in such wrapped condition, and (c) head restraint means coupled to said band and adapted to be coupled to the headrest for restraining the user's head against lateral side-to-side movement relative to the headrest.

Accordingly, the user can then doze or sleep with his or her head comfortably held oriented in a generally forward condition by the chair or seat headrest supporting the head. Typically the head restraint means may comprise a second band adapted to be attached to said headrest so that a portion of the second band extends laterally at the front of the headrest, and auxiliary means may interconnect said first and second bands at laterally spaced locations. The said auxiliary means may comprise auxilary bands which are laterally spaced apart.

Further, a second retaining means may be associated with said second band for retaining the second band in adjustably wrapped condition closely about backrest; the second band may have opposite end portions, and said second retaining means may comprise a buckle associated with one of the second band end portions.

The first band typically has opposite end portions and the band retaining means may comprise hook and pile pad elements associated with said first band opposite end portions, respectively. Further, means may be provided on said bands for storing the first band adjacent the second band attached to the headrest, and when the first band is not in use. Also an eye cover may be provided on the first band.

In a second embodiment, especially adapted for use by children, front portions of the second band are releasably interconnected with a rear portion of the first band; and a flap associated with the second band typically has a down position to frontwardly cover substantial portions of the second band when user's head restraint is not desired, and also has an up-position to expose the second band and to enable releasable interconnection of hook and pile pad elements when user's head restraint is desired. In this regard, the headrest may then have a forwardly opening U-shaped configuration, and a third band may attach to the headrest at laterally spaced locations and also attach to a front portion of the first band to restrain head forward movement, as during vehicle sudden deceleration.

These and other objects and advantages of the invention, as well as the details of an illustrative embodiment, will be more fully understood from the following specification and drawings, in which:

DRAWING DESCRIPTION

FIG. 1 is a perspective view of a restraint or head support embodying the invention;

FIG. 2 is a view like FIG. 1, but showing the restraint attached to a headrest;

FIG. 3 is a view like FIG. 2, showing the restraint attached to the head of a traveler;

FIG. 4 is a perspective view of a modified head band restraint;

FIG. 5 is a perspective view showing use of the FIG. 4 restraint; and

FIG. 6 is a view like FIG. 5 showing release of attachment of the FIG. 4 band from a headrest.

DETAILED DESCRIPTION

Referring first to FIGS. 1–3, a traveler 10 is shown with his (or her) head 11 positioned to face forwardly relative to the headrest 12 of chair or seat 13.

The head support apparatus 14 of the invention includes a first band adapted to be fitted in adjustably wrapped condition, closely about the user's head, and at eye or forehead level. The illustated first band 15 comprises, for example, flexible webbing of sewn construction, having opposite end portions 15a and 15b. Retention means is associated with the first band for retaining it in such wrapped condition, that retention means for example comprising hook and pile (VELCRO for example) pad elements associated with band end portions 15a and 15b. See for example pad 16 attached to the inner side of end portion 15a, and pad 17 proximate and indirectly carried by end portion 15b, whereby such pads may be pushed together after close wrapping of the band about the wearer's upper head, as seen in FIG. 3. Pads 16 and 17 also have a second function—i.e. to hold auxiliary band 18 in position, as shown, and as will be described, the pad 17 being carried by the end portion 18a of band 18, that portion 18a being attached, as by sewing, to end portion 15b of band 15.

The invention encompasses the provision of head restraint means coupled to band 15, and adapted also to be coupled to the headrest 12, for restraining the user's head against unwanted lateral, or side-to-side, movement relative to the headrest, as induced for example by vehicle or aircraft vibration or bumpiness. (Such head motion would and does disturb the traveler's comfort, rest and sleep, as he or she relaxes). In the illustrated example, the referenced head restraint means comprises a second band 19 adapted to be attached to the headrest so that a portion of the second band or strap extends laterally at or across the front side of the headrest; together with auxiliary means interconnecting the first and second bands at laterally spaced locations.

More specifically, the second band 19 may have opposite end portions as at 19a and 19b, and second restraining means may be provided (as exemplified by buckle loop 20) in association with the second band for retaining it in adjustably wrapped condition closely about the headrest 12. Buckle 20 is shown attached to band end portion 19a, to receive and retain band end portion 19b, as seen in FIG. 3. See also buckle loops 20a and 20b.

The above mentioned auxiliary means interconnecting bands 15 and 19 may advantageously (from a simplicity of use, construction, and band integration standpoint) comprise auxiliary bands 18 and 21, which are laterally spaced apart. Band 18 has opposite ends 18a and 18b, end 18a attached to first band end portion 15b, and end portion 18b attached to second band end portion 19a; and band 21 has opposite ends 21a and 21b, end portion 21a attached to mid-portion 15c of band 15, and end portion 21b attached to mid-portion 19c of band 19. In use, band end portions 18a and 21a are directly laterally spaced apart, and band end portions 18b and 21b are directly and laterally spaced apart, bands 18 and 21 being slightly tensioned and angled rearwardly and laterally oppositely to transfer lateral head loading to band 19, thereby preventing unwanted head twisting, left and right.

A further function of the band assembly is to store the first band 15 closely adjacent the second band attached to the headrest, with bands 18 and 21 thus collapsed and stored between bands 15 and 19, as when the band 15 is not in use about the wearer's head. See for example the VELCRO pad 22 on band 19 in FIG. 2 at one side of the headrest to receive and hold pad 17, and a similar Velcro pad (not shown) on band 19, at the opposite side of the headrest, to receive and hold pad 16 turned inwardly; thus bands 15 and 19 have additional functions.

FIG. 9 also shows an eye cover 24 associated with first band 15, and of sufficient width to cover the eyes of the user.

Referring now to FIGS. 4–6 first band 30 corresponds to band 15, in that it adjustably wraps closely about the user's (in this case an infant or child) head 31. Overlapping VELCRO retention pads are located at region 32, and on end portions of the band, in a manner similar to pads 16 and 17, as described above, except that auxiliary bands as at 18 and 19 are not required.

Head restraint means to restrain head movement from side-to-side is provided, and includes a second band 32 attached to the front side of the headrest 33 (in this case on an infant seat 34). The headrest is shown as having forwardly opening U-shaped configuration, so that second band 32 also has forward U-shape. Band 32 may be permanently attached to the front side of the headrest.

The head restraint means also includes auxiliary means, such as VELCRO hook and pile pads 35 and 36, to interconnect front portions of band 32 with rear portions of band 30. Pads 35 and 36 (respectively on bands 30 and 32) typically have sufficient lateral extent to interconnect at multiple laterally spaced locations and prevent lateral side-to-side movement of the infant's head. A third strap or band 37 may be provided to further resist head lateral movement and also block head forward movement (relative to the headrest) as during vehicle sudden deceleration. As shown in FIG. 5, the band 37 is releasably attachable (as by snaps 38) to the headrest, at laterally spaced locations, and also extends across the front of the first band. VELCRO pads on bands 30 and 37 may interconnect them at front and center overlap location 39.

A flap 40 is associated with second band 32 to have a down-position (see FIG. 6) frontwardly covering a substantial portion of the VELCRO pad 36 at the rear of the infant's head, and also to cover laterally spaced forward extensions (optional) 36a of pad 36, when user's head restraint is not desired. Alternatively, flap may be lifted to up-position (see FIG. 5) to expose the second band and pad 36 to enable interconnection of pads 35 and 36, for restraint purposes. Pad element or elements 36 are also shown as extending at 36a forwardly at one or both sides of the user's head, to enable optional retention of the head in laterally turned position (with rear pad 35 for example engaging pad extension 36a at the right when the head is turned to the left, or vice versa).

I claim:

1. In a head support for a traveler sitting in a chair having a headrest, and including said headrest, the combination comprising
  (a) a first band adapted to be fitted in adjustably wrapped condition closely about the user's head and at eye or forehead level,
  (b) band retention means associated with said band for retaining the band in said wrapped condition, and
  (c) head restraint means coupled to said band and adapted to be coupled to said headrest for restraining the user's head against lateral side-to-side movement relative to the headrest,
  (d) said head restraint means comprising a second band attached to said headrest so that a portion of the second band extends laterally at the front of the headrest, and auxiliary means interconnecting said first and second bands at laterally spaced locations, said auxiliary means comprising hook and pile pad elements associated with said front portions of the second band and said rear portion of the first band,
  (e) a flap carried by the headrest and associated with said second band, and having a down position to frontwardly cover substantial portions of the second band when user's head restraint is not desired, and also having an up-position to expose the second band and to enable releasable interconnection of said hook and pile pad elements when user's head restraint is desired,
  (f) said second band and said hook and pile pad elements thereon extending forwardly at laterally opposite sides of said first band when wrapped about the user's head.

* * * * *